United States Patent
De Araujo et al.

(10) Patent No.: US 7,352,211 B1
(45) Date of Patent: Apr. 1, 2008

(54) SIGNAL HISTORY CONTROLLED SLEW-RATE TRANSMISSION METHOD AND BUS INTERFACE TRANSMITTER

(75) Inventors: Daniel N. De Araujo, Cedar Park, TX (US); Daniel M. Dreps, Georgetown, TX (US); Bhyrav M. Mutnury, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 11/466,122

(22) Filed: Aug. 22, 2006

(51) Int. Cl.
*H03K 19/0175* (2006.01)
*H03B 5/22* (2006.01)

(52) U.S. Cl. .......................... 326/86; 326/83; 326/113; 327/108; 327/65

(58) Field of Classification Search .................. 326/83, 326/86; 327/108, 65
See application file for complete search history.

(56) References Cited

U.S. PATENT DOCUMENTS

| | | | |
|---|---|---|---|
| 6,262,617 B1 | 7/2001 | McClure | |
| 6,278,306 B1 | 8/2001 | Ang et al. | |
| 6,294,924 B1 | 9/2001 | Ang et al. | |
| 6,377,076 B1 | 4/2002 | Gauthier | |
| 6,393,062 B1 | 5/2002 | Furman et al. | |
| 6,429,708 B2 | 8/2002 | Asano et al. | |
| 6,504,396 B2 | 1/2003 | Sher et al. | |
| 6,664,811 B1 | 12/2003 | Bridgewater, Jr. | |
| 6,704,818 B1 | 3/2004 | Martin et al. | |
| 6,772,250 B2 | 8/2004 | Dreps et al. | |
| 6,853,220 B2 * | 2/2005 | De Laurentiis et al. | 327/108 |
| 6,956,407 B2 * | 10/2005 | Baig et al. | 327/65 |
| 6,977,534 B2 * | 12/2005 | Radelinow | 327/112 |
| 7,030,670 B2 | 4/2006 | Lin | |
| 7,196,557 B1 * | 3/2007 | Kwasniewski et al. | 327/108 |
| 2005/0093580 A1 * | 5/2005 | Baig et al. | 327/65 |
| 2007/0139086 A1 * | 6/2007 | Liu | 327/108 |

* cited by examiner

*Primary Examiner*—Vibol Tan
(74) *Attorney, Agent, or Firm*—Mitch Harris, Atty at Law, LLC; Andrew M. Harris; Casimer K. Salys

(57) ABSTRACT

A signal history controlled slew-rate transmission method and bus interface transmitter provide an improved channel equalization mechanism having low complexity. A variable slew-rate feed-forward pre-emphasis circuit changes the slew rate of the applied pre-emphasis in conformity with the history of the transmitted signal. The pre-emphasis circuit may be implemented by a pair of current sources supplying the output of the transmitter, and having differing current values. The current sources are controlled such that upon a signal value change, a high slew rate is provided and when the signal value does not change for two consecutive signal periods, the slew rate is reduced. A current source having a controlled magnitude may be employed to provide a slew rate that changes over time and is continuously reduced until another transmission value change occurs.

3 Claims, 5 Drawing Sheets

SIGNAL HISTORY CONTROLLED SLEW-RATE TRANSMISSION METHOD AND BUS INTERFACE TRANSMITTER

BACKGROUND OF THE INVENTION

1. Technical Field

The present invention relates generally to electrically connected bus interface circuits, and more particularly, to bus interface circuits having signal history controlled pre-emphasis.

2. Description of the Related Art

Interfaces between present-day system devices and also between individual circuits have increased in operating frequency and complexity. In particular, high speed serial bus interfaces typically require sophisticated signal processing in order to achieve maximum bandwidth over cost-effective channel interconnects.

Numerous signaling and reception techniques have been employed to extract the maximum possible data rate from a given channel, for example, feed-forward equalization (FFE) such as signal-history based pre-emphasis/de-emphasis on the transmission side, distributed equalization within the channel in or discrete equalization with respect to the channel characteristics, and receiver-side equalization such as decision feedback equalization, peaking amplifiers, or both linear and adaptive equalizers.

All of the above techniques, although effective, have significant costs in terms of die area, power consumption and complexity. Transmitter-side FFE is most commonly employed, and while desirable, produces sub-optimal signal transmission and reception.

In transmitter-side FFE, the current level provided to interface signal lines is controlled at two or more levels, with the current in intervals where a change in signal value has occurred set to a higher level. In intervals where no change has occurred, the current level is set to a lower current value. Although relatively simple to implement, the transmitter-side FFE current switching scheme yields less than optimal results, in that overshoot typically occurs at the receiver side of the interface for certain data patterns.

It is therefore desirable to provide a bus interface transmitter and transmission method having improved transmitter-side channel equalization characteristics.

SUMMARY OF THE INVENTION

The objective of improving transmitter-side channel equalization characteristics is accomplished in a bus interface transmitter and transmission method.

The transmitter includes a feed-forward pre emphasis circuit having a variable slew rate. The slew rate is adjusted in conformity with a history of the transmitted signal, providing an improved pre-emphasis characteristic. The method is a method of operation of the bus interface transmitter.

The variable slew rate can be provided by a pair of current sources having different current levels. The weaker of the current sources has a controlled slew-rate that is slower than the stronger of the current sources. The polarity of the weaker current source is controlled by the previous transmission value of the interface signal, and the polarity of the stronger of the current sources is controlled by the present transmission value. The polarity of the two current sources is opposite for the same transmission value. The result is that the slew rate of the overall transmitter output changes to a lower level when the same value is transmitted consecutively. When the interface output current magnitude shifts due to the change in pre-emphasis, the change occurs at a lower slew-rate, suppressing overshoot that would otherwise occur due to channel characteristics.

The weaker current source may also have a dual rate controlled magnitude so that at the beginning of transmission value changes the interface bus is driven with high slew-rate from both the weaker and stronger current sources, until two consecutive same-valued transmissions occur, and then the change in the magnitude of the weaker current source is slowed.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns the control of pre-emphasis in bus transmitter circuits and methods of pre-emphasis for signal transmission on an electrically-connected interface buses. Rather than only changing current level on the interface, the present invention uses dynamic slew-rate control so that when the pre-emphasis current boost is removed, it is removed at a lower rate, reducing the overshoot that would otherwise occur. The slew-rate control controls the rate of change of the current supplied to the interface bus terminals) of the transmitter.

Figure 1:
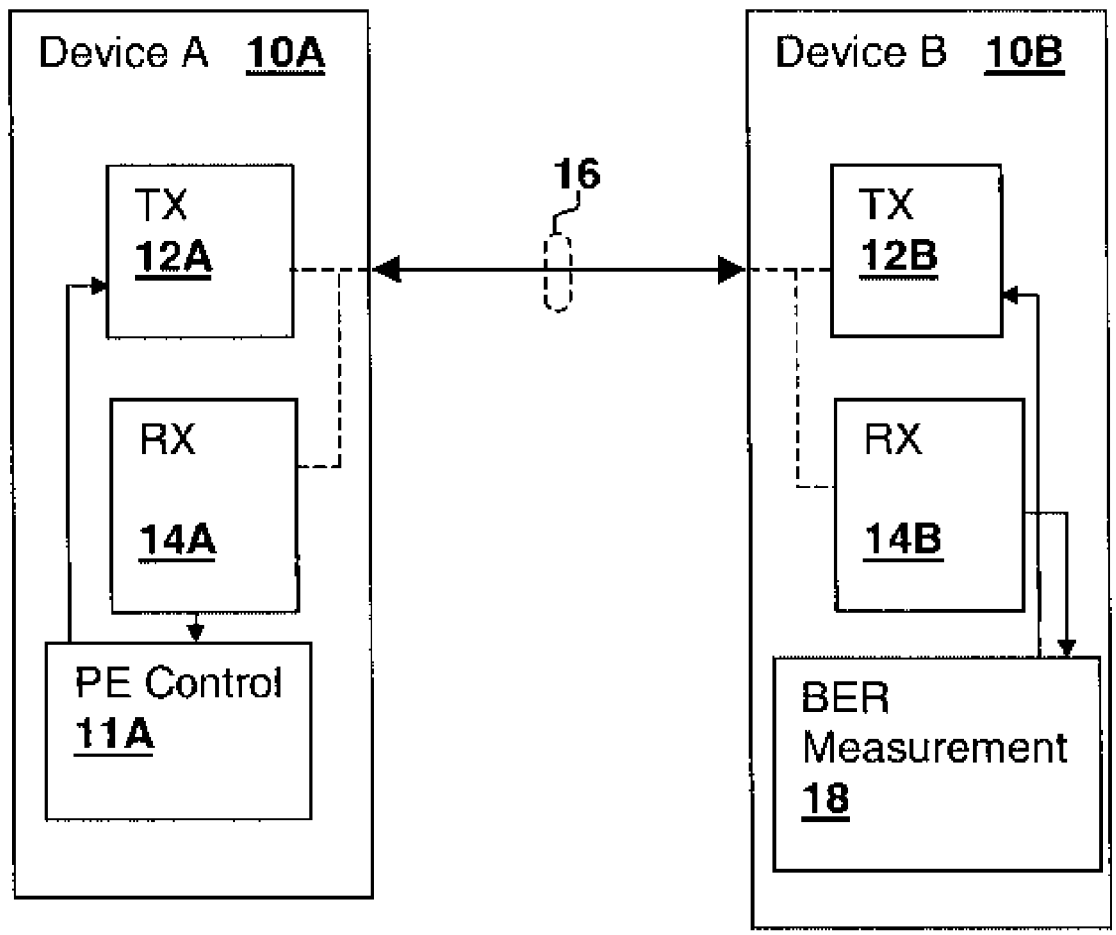
FIG. 1 is a block diagram of two devices in accordance with embodiments of the invention connected by an interface bus.

With reference now to the figures, and in particular with reference to FIG. 1, there is depicted a block diagram of devices 10A and 10B connected by a bus interface 16. Devices 10A, 10B may be located within a device such as a computer peripheral, a computer system, or within integrated circuits interconnected within a system. Interface 16 may be a single two wire bi-directional interface as depicted, or may be a full-duplex single wire interface or a differential interface. Devices 10A, 10B include transmitter circuits 12A and 12B in accordance with an embodiment of the present invention. Devices 10A, 10B also include receivers 14A, 14B for receiving signals from the opposite ends of interface 16. Device 10B is illustrated has having a bit error measurement circuit 18 and device 10A is shown as having a pre-emphasis control circuit 11A that may be used in conjunction to adjust pre-emphasis levels, select or de-select pre-emphasis, or adjust pre-emphasis parameters in transmitter 12A in order to reduce bit-error rate by maximizing the noise and timing margins of the "eye opening" of the received signal.

Figure 2A:
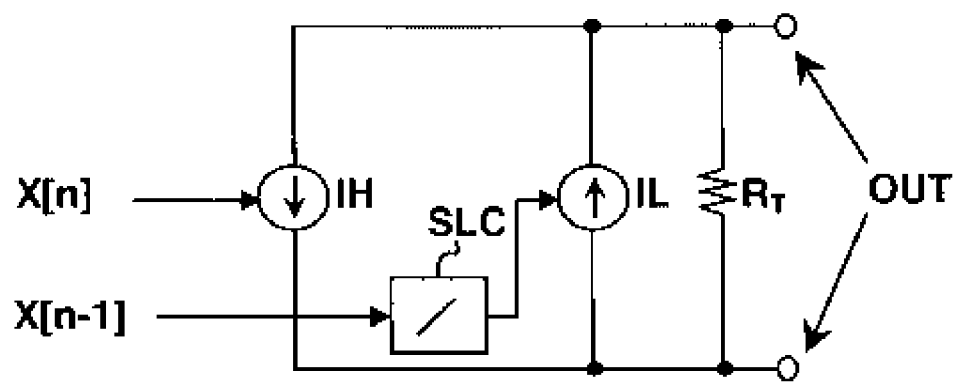
FIG. 2A is a simplified schematic diagram of a transmitter circuit in accordance with an embodiment of the invention.

Referring now to FIG. 2A, a simplified schematic diagram of a transmitter circuit in accordance with an embodiment of the present invention is shown. A pair of current sources IH and IL are polarity controlled by an input signal X[n] and the previous value of the input signal X[n−1], respectively. Current sources IH and IL are arranged in opposite polarity with respect to the output terminals OUT of the transmitter, so that when present value X[n] is not equal to previous value X[n−1], the current sources add to provide the maximum possible current level. When present value X[n] is equal to previous value X[n−1], the difference between the current source levels is provided to the OUT terminals. Unique to the present invention is a slew-rate control circuit SLC that controls the rate at which current source IL is applied to the OUT terminals and termination resistor $R_T$. In the depicted embodiment, when the interface data value changes, (i.e., at the beginning of a data bit in which present value X[n] is not equal to previous value X[n−1]), the rate of current change at the OUT terminals will be the natural maximum slew-rate of current source IH plus a contribution from current source IL limited by the slew rate of slew-rate control circuit SLC. When the interface data value does not change at the beginning of a data bit interval, the rate of change at the OUT terminals will be the slew-rate as controlled by slew rate control circuit SLC. The result of the reduced slew rate is reduced overshoot on the interface bus 16 when the pre-emphasized level +/−(IH+IL) is changed to the non-emphasized level +/−(IH−IL).

Figure 2B:
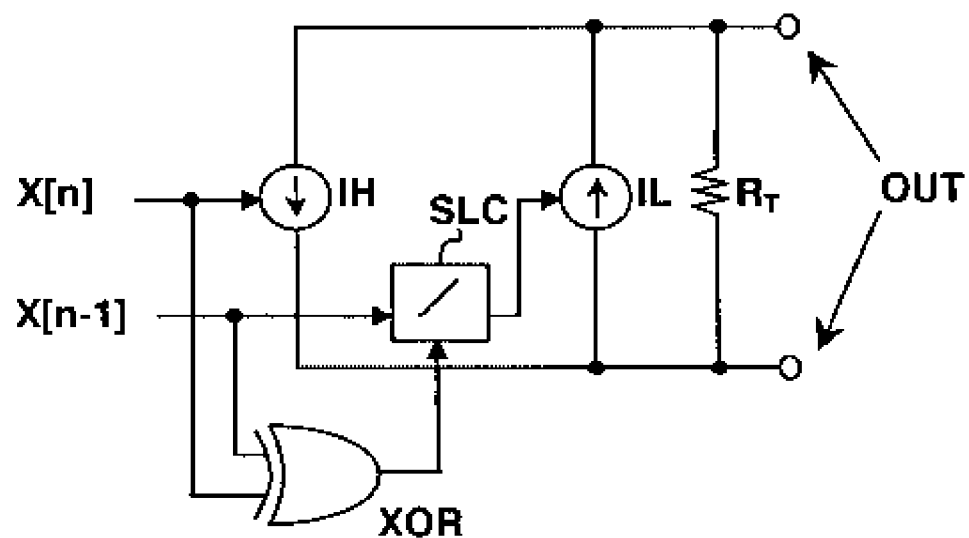
FIG. 2B is a simplified schematic diagram of a transmitter circuit in accordance with another embodiment of the invention.

Referring now to FIG. 2B, a simplified schematic diagram of a transmitter circuit in accordance with another embodiment of the present invention is shown. The depicted embodiment is similar to that of the circuit of FIG. 2A, so only differences between them will be described. In the depicted embodiment, a logical exclusive-OR (XOR) gate XOR controls the slew rate of slew-rate control circuit SLC to provide a higher slew-rate from current source IL when present value X[n] is not equal to previous value X[n−1], so that upon a data change, the contribution of IL to the overall slew-rate is greater than that of the circuit of FIG. 2A, while maintaining a lower controlled slew-rate when the pre-emphasis is removed.

Figure 3A:
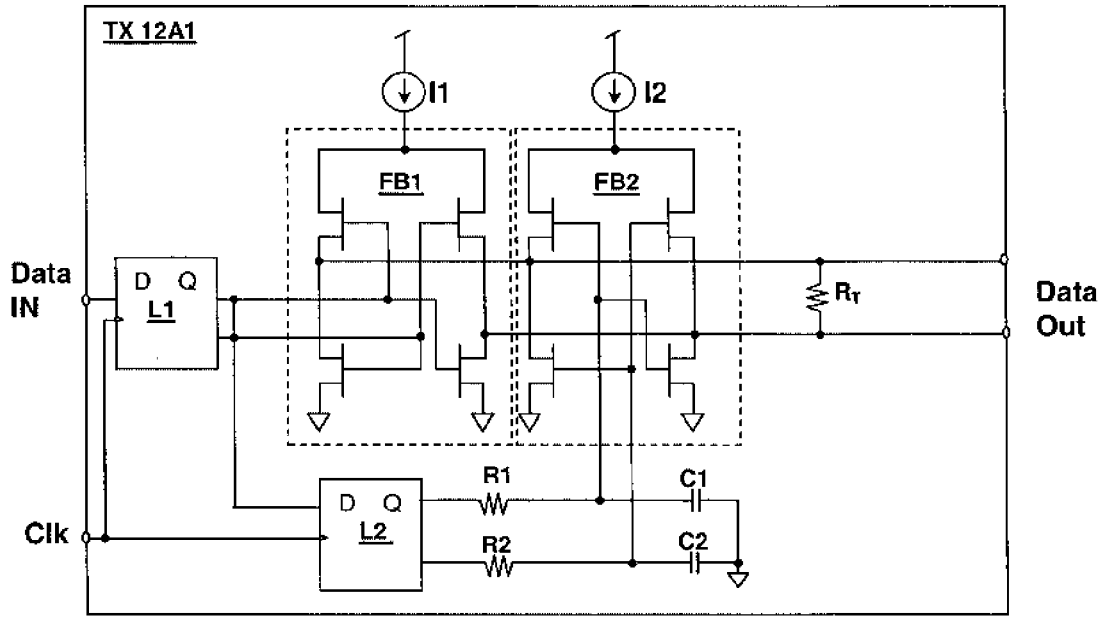
FIG. 3A is a detailed schematic diagram of a transmitter circuit in accordance with yet another embodiment of the invention.

Referring now to FIG. 3A, a detailed schematic diagram of a transmitter circuit TX12A1 in accordance with yet another embodiment of the present invention and which may be used to implement the circuit of FIG. 2A is shown. In the depicted embodiment, primary current source I1 provides the IH current level and secondary current source I2 provides the IL current level. A set of full bridge switches FB1 and FB2 selectively apply the currents provided by current sources I1 and I2, respectively, to the Data Out terminals. A latch L1 provides the control input signals to full bridge FB1, which represent present data value X[n] as sampled by a clock signal Clk. A second latch L2 provides the control input signals to full bridge FB2, which represent previous data value X[n−1]. A pair of RC networks formed by resistors R1 and R2 and capacitors C1 and C2, control the rate of change of the control signals applied to full-bridge FB2, so that the slew rate of current source I2 as applied to the output terminals is decreased over the slew rate that would otherwise be provided by full-bridge FB2 alone. The RC networks formed by resistors R1 and R2 and capacitors C1 and C2 are illustrative of one means for reducing the slew rate of the secondary current switching, but the implementation of the slew rate control is not limited, as will be seen in the transmission gate implementations described below. A transmission gate can be used to replace each of transistors R1 and R2 and capacitors C1 and C2 may or may not be required, depending on the gate capacitances of full-bridge FB2.

Figure 3B:
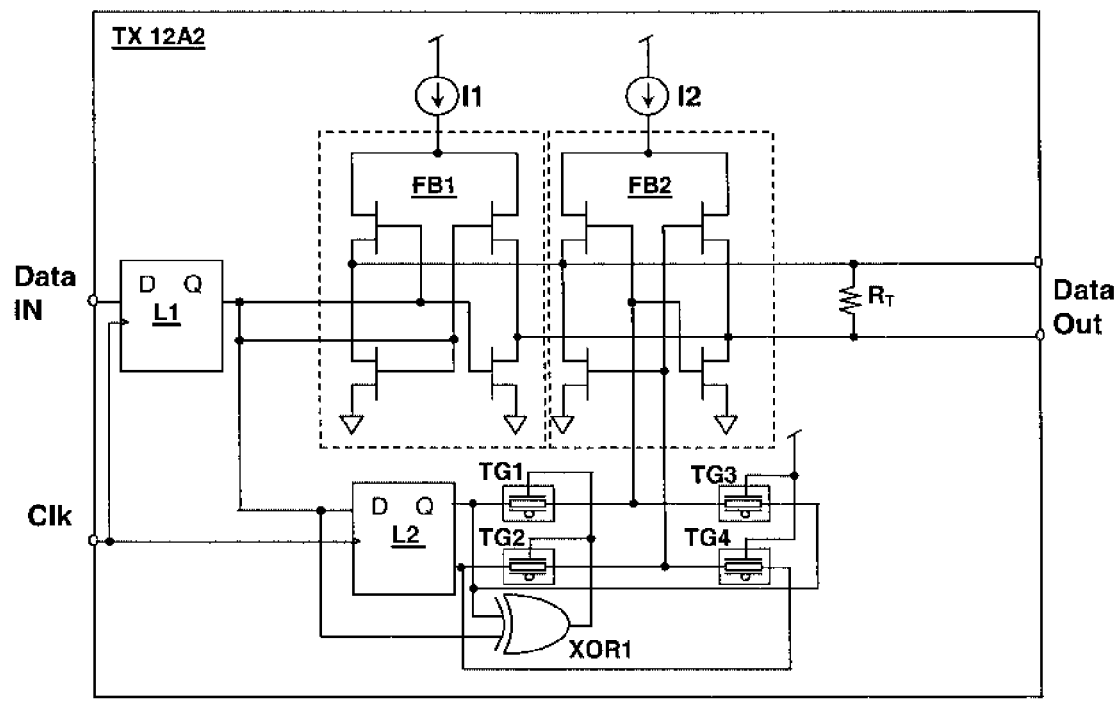
FIG. 3B is a detailed schematic diagram of a transmitter circuit in accordance with still another embodiment of the invention.

Referring now to FIG. 3B, a detailed schematic diagram of a transmitter circuit TX12A2 in accordance with yet another embodiment of the present invention, and which may be used to implement the circuit of FIG. 2B, is shown. The depicted embodiment is similar to that of the circuit of FIG. 3A, so only differences between them will be described. In the depicted embodiment, a logical exclusive OR gate XOR1 controls a set of transmission gates TG1 and TG2 that apply the outputs of latch L2 to the control inputs of full-bridge FB2. Another set of transmission gates TG3 and TG4, having higher resistance than transmission gates TG1 and TG2, are hardwired in an enabled configuration. When present value X[n] and previous value X[n−1] do not match, all four transmission gates TG1-4 are enabled, providing a higher slew rate of current source I2 as applied to the Data Out terminals by full-bridge FB2. However, when present value X[n] and previous value X[n−1] match, only transmission gates TG1 and TG2 are enabled, reducing the slew rate of current source I2 as applied to the Data Out terminals.

Figure 4A:
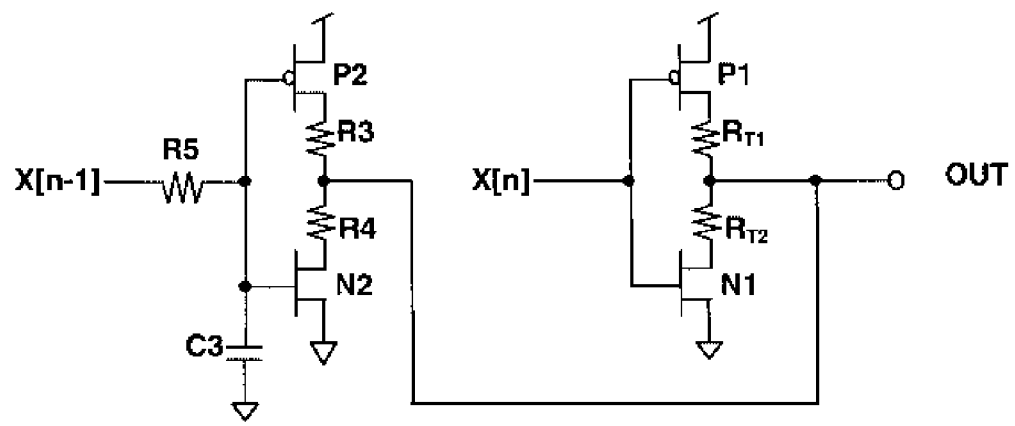
FIG. 4A is a schematic diagram of a single-ended transmitter circuit in accordance with an embodiment of the invention.

Referring now to FIG. 4A, a schematic of a single-ended interface transmitter in accordance with an embodiment of the present invention is shown. Data value X[n] controls a primary driver stage connected to the OUT terminal and comprising transistors P1 and N1 which apply current from one or the other power supply rail through one of termination resistors $R_{T1}$ and $R_{T2}$. A secondary driver stage formed by transistors P2 and N2 applies a lower secondary current to the OUT terminal through one of resistors R3 and R4, which have higher resistance values than termination resistors $R_{T1}$ and $R_{T2}$. Capacitor C3 and resistor R5 provide an RC network that lowers the slew rate of the switching of transistors N2 and P2, so that the slew rate of the secondary driver stage formed by transistor N2 and P2 is lower than that of the primary driver stage formed by transistors N1 and P1.

Figure 4B:
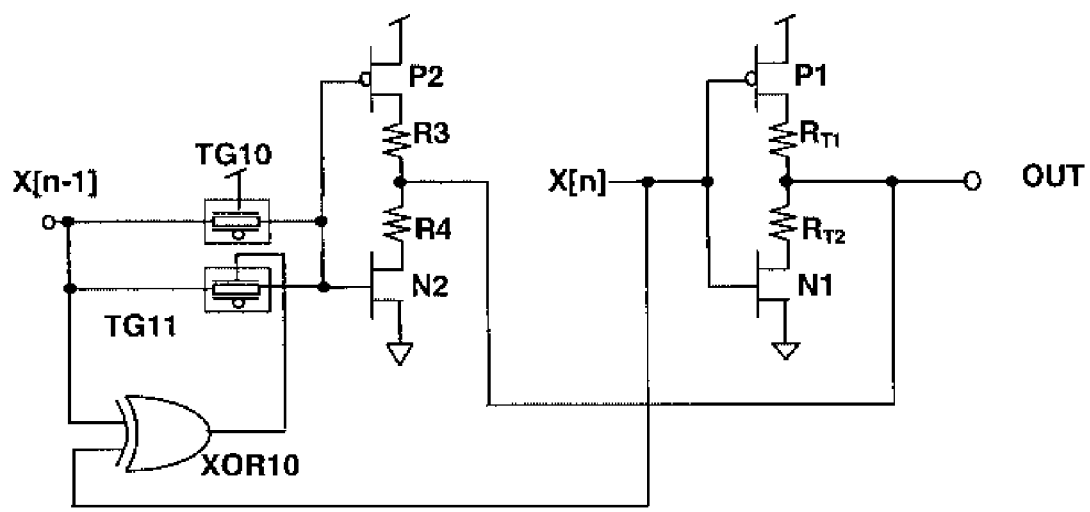
FIG. 4B is a detailed schematic diagram of a single-ended transmitter circuit in accordance with another embodiment of the invention.

Referring now to FIG. 4B, a schematic diagram of another single-ended transmitter circuit in accordance with another embodiment of the present invention is shown. The depicted embodiment is similar to that of the circuit of FIG. 4A, so only differences between them will be described. In the depicted embodiment, a logical exclusive-OR gate XOR10 controls transmission gate TG11, having a lower impedance than transmission gate TG10, which is hardwired in an enabled configuration. Transmission gate TG11 is enabled when present signal value X[n] and previous value X[n−1] do not match, providing a higher slew rate from the secondary driver formed by transistors N2 and P2 than when value X[n] and previous value X[n−1] match, when gate control of transistors P2 and N2 is provide through higher impedance transmission gate TG10. In the above-described embodiment, as well as for the embodiment of FIG. 3B, it is possible that the resistance of all of the transmission gates could be the same, or even reversed in their magnitude as described. Since the parallel impedance of the permanently enabled transmission gate and the controlled transmission gate will always be lower than that of the permanently enabled transmission gate, depending on design values, the controlled transmission gate may also have a low impedance, and possibly lower than that of the permanently enabled transmission gate. Also, it is contemplated that other techniques for providing a limited-slope control signal can be substituted in any of the above embodiments such as current sources charging capacitors (integrators), other filter networks in addition to RC networks and any other suitable circuits.

Figure 5:
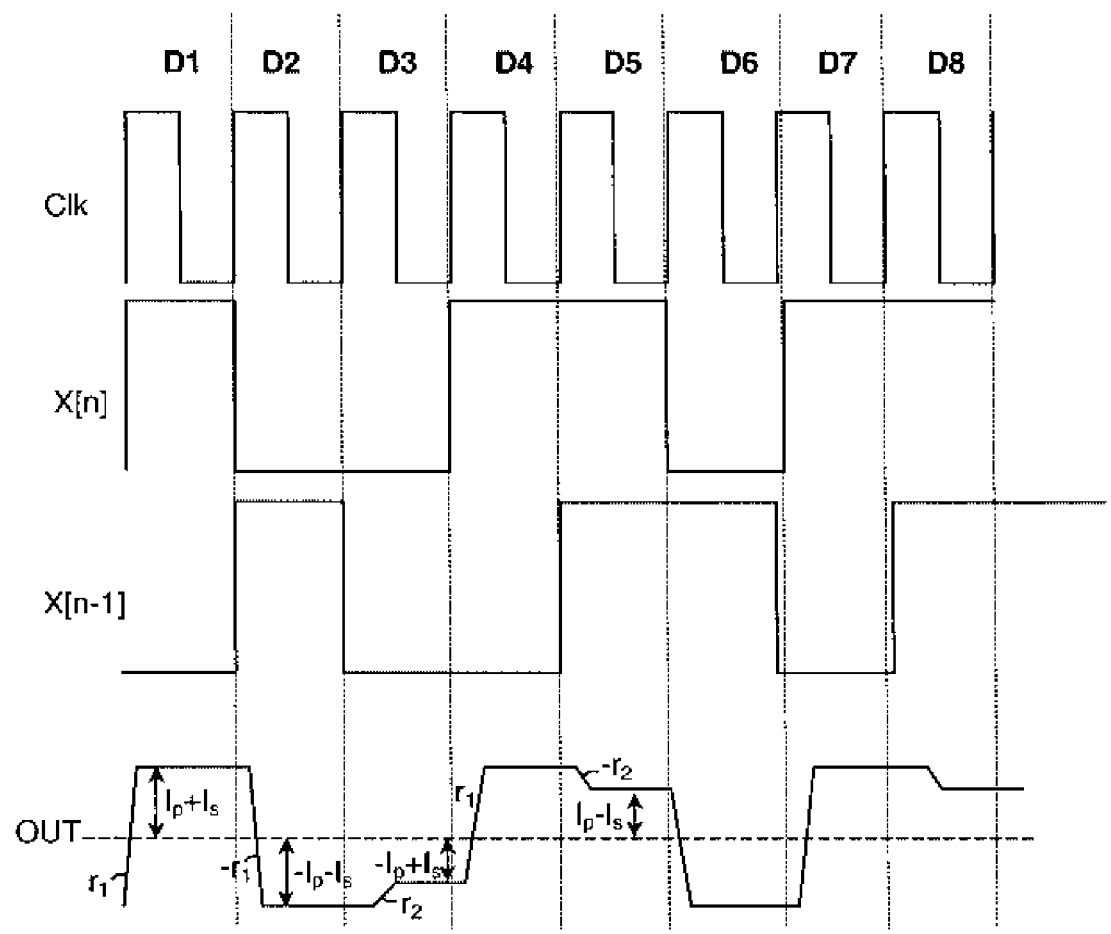
FIG. 5 is a signal diagram depicting a signal generated by a transmitter circuit in accordance with an embodiment of the present invention.

Referring now to FIG. 5, a signal diagram depicting signals as provided by transmitters in accordance with embodiments of the present invention is shown. Clock signal Clk, present data value signal, X[n] and previous data value X[n−1] are shown in relation to an output current waveform OUT. During the first data interval D1, the output current is at pre-emphasized level $I_p+I_s$ and during the second data interval D2 the output current is at pre-emphasized level $-(I_p+I_s)$. The slew-rate entering intervals D1 and D2 is rate r1, which for the circuit embodiments of FIGS. 2A, 3A and 4A, will generally be close to the slew rate of the primary driver circuit. For the circuit embodiments of FIGS. 2B, 3B and 4B, rate r1 will be higher than that of the primary drive due to the lowered impedance of the control path when X[n] and X[n−1] are different. During the third data interval D3, since X[n] has not changed, the pre-emphasis is removed and the current level changes to $-(I_p-I_s)$ at rate r2 as controlled by the slew-rate control circuit of the present invention. Similarly, while rate r1 is present during the transition from data interval D3 to data interval D4, the slew-rate is again reduced to rate r2 when X[n] does not change from interval D4 to D5.

The above-described embodiments disclose the application of a binary-valued input signal to an electrically-connected bus interface terminal. However, it is contemplated that the techniques and structures herein may be applied to multi-level signaling interfaces such as multi-level pulse-amplitude modulated (PAM) signals such as PAM4, PAM8, and also in phase-shift modulated signals such as traditional phase-shift key (PSK) and duo-binary signaling. The slew rate control of the present invention may be applied to arbitrary step sizes within any pre-emphasized waveform, with consequent benefits in channel-induced overshoot reduction when pre-emphasis is removed.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of providing an output signal to an interface bus electrically connected to a remote receiver, said method comprising:
  receiving an input signal;
  retaining at least one previous value of said input signal;
  applying a current to at least one electrical terminal connected to said interface bus having a polarity selected in conformity with a present value of said input signal, and wherein a rate of change of said current is varied dynamically in conformity with a difference between said present value and said at least one previous value, wherein said applying comprises first applying a primary current to at least one electrical terminal connected to said interface bus, wherein a polarity of said first applying is selected in response to a present value of input signal, and second applying a secondary current to said at least one electrical terminal, wherein a polarity of said applying is selected in response to a previous value of input signal, wherein said secondary current has a predetermined rate of change substantially slower than that of said primary current, and wherein said predetermined rate of change is provided by supplying said at least one previous value to an input of a transmission gate, and coupling an output of said transmission gate to a switch controlling said polarity of said secondary current, whereby an impedance of said transmission gate determines said predetermined rate of change of said secondary current.

2. The method of claim 1, further comprising dynamically varying said rate of change of said secondary current.

3. The method of claim 2, wherein said rate of change of said secondary current is varied dynamically in conformity with said difference between said present value and said at least one previous value.

* * * * *